US005942338A

United States Patent [19]

Arbab et al.

[11] Patent Number: 5,942,338

[45] **Date of Patent: *Aug. 24, 1999**

[54] COATED ARTICLES

[75] Inventors: Mehran Arbab, Allison Park; Russell C. Criss, Pittsburgh; Gary J. Marietti, Cheswick; Paul A. Medwick, Pittsburgh, all of Pa.

[73] Assignee: PPG Industries Ohio, Inc., Cleveland, Ohio

[ * ] Notice: This patent is subject to a terminal disclaimer.

[21] Appl. No.: 09/023,746

[22] Filed: Feb. 13, 1998

Related U.S. Application Data

[63] Continuation-in-part of application No. 08/807,352, Feb. 27, 1997, Pat. No. 5,821,001

[60] Provisional application No. 60/015,718, Apr. 25, 1996.

[51] Int. Cl.[6] ............................ B32B 17/06; B21D 39/00

[52] U.S. Cl. .......................... 428/623; 428/630; 428/632; 428/633; 428/670

[58] Field of Search .................................... 428/623, 630, 428/632, 633, 670

[56] References Cited

U.S. PATENT DOCUMENTS

| | | | |
|---|---|---|---|
| 4,610,771 | 9/1986 | Gillery . | |
| 4,716,086 | 12/1987 | Gillery et al. . | |
| 4,806,220 | 2/1989 | Finley . | |
| 5,110,662 | 5/1992 | Depauw et al. . | |
| 5,413,864 | 5/1995 | Miyazaki et al. . | |
| 5,821,001 | 10/1998 | Arbab et al. | 428/623 |

FOREIGN PATENT DOCUMENTS

| | | |
|---|---|---|
| 0 183 052 | 12/1991 | European Pat. Off. . |
| 0 275 474 | 7/1992 | European Pat. Off. . |
| 0 747 330 | 12/1996 | European Pat. Off. . |

OTHER PUBLICATIONS

Minami, T. et al., “Properties of transparent zinc–stannate conducting films prepared by radio frequency magnetron sputtering”, *Journal of Vacuum Science and Technology A*, vol. 13, No. 3 (1995) pp. 1095–1099.

*Primary Examiner*—Ponnathapura Achutamurthy
*Attorney, Agent, or Firm*—Kenneth J. Stachel; Donald C. Lepiane

[57] ABSTRACT

Multilayer high transmittance, low emissivity coatings deposited over transparent substrates have improved mechanical durability, e.g. scratch resistance by the inclusion of at least one mechanical durability enhancing layer (hereinafter “MDE layer”). The MDE layer includes one or more pairs of a zinc oxide sublayer having deposited thereover a sublayer of an oxide of zinc and tin. In one embodiment of the present invention, the MDE layer is composed of two sublayers which includes a first sublayer of an oxide of zinc having deposited thereover a second sublayer of an oxide of zinc and tin. In another embodiment of the invention, the MDE layer is composed of four sublayers which includes a first sublayer of an oxide of zinc, having deposited thereover a second sublayer of an oxide of zinc and tin, having deposited thereover a third sublayer of an oxide of zinc, having deposited thereover a fourth sublayer of an oxide of zinc and tin. Coated articles having the MDE layer of the invention can be thermally processed for tempering, heat strengthening, annealing or bending without haze formation and can be manipulated prior to such thermal processing with little or no surface scratching appearing after such thermal processing.

19 Claims, No Drawings

COATED ARTICLES

CROSS REFERENCE TO RELATED APPLICATIONS

This application is a continuation-in-part application of U.S. patent application Ser. No. 08/807,352 filed Feb. 27, 1997, now U.S. Pat. No. 5,821,001, which in turn claimed the benefit of U.S. Provisional Application No. 60/015,718 filed Apr. 25, 1996.

BACKGROUND OF THE INVENTION

1. Field of the Invention

The present invention relates generally to the art of multilayered coatings providing high transmittance and low emissivity, to articles including substrates having such coatings deposited thereon, and more particularly to coatings formed of metal and metal oxides deposited on transparent substrates.

2. Discussion of the Presently Available Technology

High transmittance, low emissivity multilayer coatings on transparent substrates, such as glass, provide coated articles which transmit visible light while minimizing the transmittance of other wavelengths of light, such as light in the infrared spectrum. Such articles are particularly useful as automotive or architectural glass because they allow the transmission of visible light therethrough, but minimize radiative heat transfer associated with infrared light.

High transmittance, low emissivity coatings generally include a reflective metal layer which provides the infrared reflectance and low emissivity, between dielectric, antireflective layers of metal oxides to reduce the visible reflectance. These multilayer coatings are typically produced by cathode sputtering, especially magnetron sputtered vacuum deposition.

U.S. Pat. No. 4,610,771 to Gillery provides multilayer coatings including a silver reflective metal layer and zinc-tin alloy oxide layers for use as a high transmittance, low emissivity coating.

U.S. Pat. No. 4,806,220 to Finley discloses a multilayer coating suitable for high temperature processing. A type of this coating utilizes metal primer layers e.g. a pair of titanium primer layers, one above and one below a reflective metal layer.

High transmittance, low emissivity coatings over transparent substrates such as glass, are susceptible to mechanical damage, including but not limited to the formation of surface scratches. The coatings may be scratched when the coated substrates are shipped or subjected to manufacturing processes. For example, when the substrate is a coated glass sheet, these manufacturing processes may include cutting operations, seaming operations, and washing operations. Washing operations may include the use of abrasive brushes or cleaners. The seaming process is essentially a sanding operation which removes edge defects that can cause breakage during tempering, and residual abrasive particles, e.g. dust, may remain on the glass surface after seaming which may tend to scratch during, for example, during subsequent washing operations. Even operations which by themselves may not tend to scratch the surface of the coating, as for example heating processes such as bending, tempering, annealing, and the like, may cause surface scratching as the substrate is handled, e.g. loaded and/or unloaded into and out of the equipment, e.g. a furnace, necessary to perform the heating process. Further, where a coating has surface scratches and is then subjected to a high temperature processing operations, (e.g. tempering), scratches present on or about the coating surface may become even more visible to the unaided eye as a result of the high temperature processing operation.

As can be appreciated by those skilled in the art of producing coating surfaces or handling coated surfaces, it would be desirable to improve the scratch resistance of coatings, particularly high transmittance low emissivity coatings deposited over substrates, such as transparent glass substrates, particularly those expected to be subjected to high temperature processing.

SUMMARY OF THE INVENTION

The present invention is directed to multilayer high transmittance, low emissivity coatings deposited over transparent substrates having improved scratch resistance due to the inclusion of at least one mechanical durability enhancing layer (hereinafter “MDE layer”).

The MDE layer includes one or more pairs of sublayers which includes a first sublayer of a predetermined hardness, microstructure and internal stress in combination with a second sublayer having a hardness, microstructure and internal stress different from the hardness of the first sublayer. The pairing of the sublayers in the MDE layer of the present invention has been found to provide a multilayered coating of unexpectedly superior mechanical durability.

The pair(s) of sublayers in the MDE layer may include a sublayer of an oxide of zinc and a sublayer of an oxide of zinc and tin. The term “sublayer” is used herein simply in the context of referring to component layers which in combination form the MDE layer. The term is not used herein in the context of referring to spatial orientation and is not used to indicate that a layer is spatially oriented below another layer.

The invention contemplates any number of pairs of sublayers to form the MDE layer. In one embodiment of the present invention, the MDE layer is composed of a single pair of sublayers which includes a first sublayer of an oxide of zinc having deposited thereover a second sublayer an oxide of zinc and tin. In another embodiment of the present invention, the MDE layer is composed of two pairs of sublayers which includes a first sublayer of an oxide of zinc having deposited thereover a second sublayer of an oxide of zinc and tin, having deposited thereover a third sublayer of an oxide of zinc, having deposited thereover a fourth sublayer of an oxide of zinc and tin.

While not limited thereto, the MDE layer of the present invention has been found to be effective when included in a multilayer high transmittance, low emissivity coated article of the type which includes a transparent glass substrate having deposited thereon in turn an antireflective base layer, a metallic reflective layer, a primer layer, and an MDE layer according to the present invention. Regardless of the number of pairs of sublayers present, the combination of the above-identified layers has been found to be particularly scratch resistant where the first sublayer of the MDE layer is an oxide of zinc in contact with the primer layer and the second sublayer is an oxide of zinc and tin and is deposited over and in contact with the first sublayer. Preferably, the MDE layer has a protective overcoat layer deposited thereover. Such a coated article has significant scratch resistance and does not contribute to haze formation when the coated article is subjected to high temperature processing.

DETAILED DESCRIPTION OF THE PREFERRED EMBODIMENTS

The present invention relates generally to the art of multilayered coatings providing high transmittance and low emissivity, to articles including substrates having such coatings deposited thereon, and more particularly to coatings formed of metal and metal oxides deposited on transparent substrates. More particularly, the present invention is directed to multilayer high transmittance, low emissivity coatings deposited over transparent substrates having improved mechanical durability, e.g. but not limited to scratch resistance, due to the inclusion of at least one MDE layer in the multilayer coating stack. The MDE layer increases the hardness and mechanical durability of the multilayered coating to prevent or significantly reduce scratching of the coating by abrasive surfaces that may contact the multilayered coating.

The MDE layer of the present invention includes one or more pairs of sublayers which includes a first sublayer of a predetermined hardness in combination with a second sublayer having a hardness different from the hardness of the first sublayer. The pairing of the sublayers in the MDE layer of the present invention has been found to provide a multilayered coating of unexpectedly superior mechanical durability. The pair(s) of sublayers may include a sublayer of an oxide of zinc having deposited thereover a sublayer of an oxide of zinc and tin. In the practice of the invention, it is preferred that the sublayer of the oxide of zinc and tin is deposited over the sublayer of the oxide of zinc to obtain the maximum mechanical durability.

The invention contemplates any number of pairs of sublayers to form the MDE layer. In one embodiment of the present invention, the MDE layer is composed of a single pair of sublayers which includes a first zinc oxide sublayer having deposited thereover a second sublayer an oxide of zinc and tin. In another embodiment of the present invention, the MDE layer is composed of two pairs of sublayers which includes a first sublayer of an oxide of zinc having deposited thereover a second sublayer of an oxide of zinc and tin, having deposited thereover a third sublayer of an oxide of zinc, having deposited thereover a fourth sublayer of an oxide of zinc and tin.

By way of background, particularly with regard to glass substrates, low emissivity is generally accepted to refer to emissivities generally lower than about 0.35, preferably lower than about 0.10 for MSVD deposited coatings and more preferably still lower than about 0.05 also for MSVD deposited coatings which is significantly lower than that of uncoated glass substrates which typically have emissivities of about 0.84. Further, for most applications, low emissivity multilayer coatings on glass in additional to lowering emissivity must meet certain color and spectral performance criteria set by, among others, the environment in which the coated article will be used and the performance demanded or desired of the product. These performance criteria include reflected color, transmitted color, and ultraviolet, visible or infrared transmittance among others. These performance criteria may be controlled or manipulated, among other ways, by controlling the refractive indices and thicknesses of the individual layers that make up the multilayered low emissivity coating. In general, the index of refraction of each layer of the coating is fixed by the material used in forming that layer. Therefore, for a given material, in order to meet the above described performance criteria, the thickness of the individual layers of the multilayered coating may be modified. The thickness of a given layer of the multilayer coating stack depends on a number of parameters. These parameters may include but are not limited to the number of cathodes used for depositing that layer, cathode power, cathode material, gas composition, and line speed. (The line speed determines the length of time that the substrate is exposed to the cathode).

In light of the foregoing background, as may be appreciated by those skilled in the art, the total thickness of the MDE layer and its individual sublayers will be determined for a particular application, at least in part, by the performance criteria required or desired of the multilayered coating. It is believed that an MDE layer having a total thickness of about 200 to 500 Angstroms, more preferably about 250 to 400 Angstroms, is acceptable for most applications. It is believed that the ranges for thicknesses of each of the sublayers in the two sublayer and four sublayer embodiments of the MDE layer set forth below in Table 1 are acceptable for most applications:

TABLE 1

| | Sublayer/ Thickness Range | Sublayer/ Thickness Range | Sublayer/ Thickness Range | Sublayer/ Thickness Range |
|---|---|---|---|---|
| Two Sublayer Embodiment | zinc oxide 20 to 300 Å | zinc stannate 20 to 300 Å | N/A | N/A |
| Four Sublayer Embodiment | zinc oxide 20 to 300 Å | zinc stannate 20 to 300 Å | zinc oxide 20 to 300 Å | zinc stannate 20 to 300 Å |

N/A = not applicable

In addition, it has been found that where the multilayered coating is of the type which includes several metal oxide-containing layers (e.g. a base layer, an MDE layer and a protective overcoat layer as discussed in more detail below) the mechanical durability of the multilayered coating may be further enhanced by controlling the atmosphere in which the metal oxide-containing layers, are deposited, where these layers are formed by the magnetron sputter vacuum deposition process (hereinafter "MSVD"). More particularly, where the deposited atmosphere for the metal oxide-containing layers (e.g. the base layer, MDE layer and protective overcoat layer) is a nominally pure oxygen atmosphere, (as opposed to, for example, a mixed atmosphere of oxygen and an inert gas, e.g. argon), the mechanical durability of a multilayered coating which included the MDE layer of the present invention was found to be significantly greater than a similar multilayered coating which included the same MDE layer, but wherein the metal oxide-containing layers (e.g. base layer, MDE layer and protective overcoat layer) were all deposited in a mixed oxygen/inert gas, e.g. argon atmosphere. Where a mixed oxygen/inert gas atmosphere is used to deposit the metal oxide-containing layers, a preponderance of oxygen in the ratio of oxygen to inert gas is desired to ensure deposition of a metal oxide. However, the amount of oxygen in the mixed oxygen/inert gas mixture may be reduced to the point before which the sputtered material is deposited predominantly as a metal. Also, preferably, sufficient oxygen is present in the mixed oxygen/inert gas atmosphere to ensure that the deposited metal-oxide containing layers are not absorbing of electromagnetic radiation in the 0.4 to 50 micrometer range. Preferably, oxygen forms at least about 50% of the mixed oxygen/inert gas sputtering atmosphere and includes the range of ratios from 50% oxygen/50% argon to nominally pure oxygen for the reasons set forth above.

The MDE layer of the present invention has been found to be effective when positioned over a primer layer as discussed below, of a multilayer coating of the type which includes a single metallic reflective layer (e.g. a single stack). The MDE layer may be in contact with the primer layer, or may be deposited over primer layer with one or more layers interposed between the MDE layer and the primer layer. Alternatively one or more MDE layers may be positioned over or in contact with one or more primer layers present in a multilayer coating of the type which includes a plurality of metallic reflective layers, e.g. two metallic reflective layers (e.g. a double stack), three metallic reflective layers (e.g. a triple stack) or more, wherein all or a portion of the metallic reflective layers present in the multilayer coating are overcoated with a primer layer.

While not limited thereto, the MDE layer of the present invention has been found to be effective when included in a multilayer high transmittance, low emissivity coated article of the type which includes a transparent glass substrate having deposited thereon in turn an antireflective base layer, a metallic reflective layer, a primer layer, and an MDE layer in accordance with the present invention, and a protective overcoat layer deposited over the MDE layer. The combination has been found to be particularly effective where the first sublayer of the oxide of zinc of the MDE layer is deposited over and in contact with the primer layer and the second sublayer of the oxide of zinc and tin is deposited over and in contact with the first sublayer. Such a coated substrate has significant scratch resistance and may be subjected to high temperature processing without contributing to haze formation.

Selected layers which may be used in combination with the MDE layer of the present invention to provide low emissivity multilayered coatings are each individually discussed in turn immediately below. This is followed by a discussion of particular non-limiting combinations of those layers with the MDE layer of the present invention to form various embodiments of the multilayered coating and coated articles of the present invention. These selected layers include a substrate, a base layer, a metallic reflective layer, a primer layer, and an optional protective overcoat layer. It is to be understood that the combinations of these layers discussed below are representative, and that other combinations to provide multilayered coatings which include the MDE layer of the present invention are contemplated as within the scope of the present invention.

The Substrate

Substrates compatible with the present invention may be made of any material including but not limited to glass, plastic, wood, metal, and ceramic and combinations thereof. Glass and plastic substrates are particularly preferred as a component of high transmittance low emissivity articles. Suitable glass substrates include but are not limited to soda-lime-silicate glass. Suitable plastic substrates include but are not limited to polyester, polyamide and polycarbonate plastic substrates. Glass or plastic transparent substrates when coated with the multilayered high transmittance low emissivity coatings of the present invention may be useful as architectural glazing or glazing (e.g. windshields, sidelights etc.), for land, sea, air and/or space vehicles.

The Base Layer

The invention is not limited to the material of the base layer. However, a preferred base layer exhibits certain characteristics. For instance, where a metallic reflective layer is capable of being deposited in any of two or more electrical resistance states, when such a metallic reflective layer is deposited over the preferred base layer of the present invention, the base layer operates on the reflective metallic layer deposited thereover to cause the reflective metallic layer to deposit itself in the lower electrical resistance state resulting in a lower emissivity value. Additionally, the base layer exhibits chemical and thermal stability when subjected to high temperature processing, such as for example, during bending, tempering and/or annealing of a glass substrate over which the base layer is deposited. In addition to being able to select base layers having the desired properties described above, it is also preferable that they can be deposited with suitable thickness and index of refraction. Thickness and index of refraction affect the color and spectral properties of the multilayered coating, as explained above. This desired combination of characteristics is achieved by a base layer having at least two parts, a "metal-contact film-part" having crystallization-directing properties, and a "support-part" providing a stable foundation for the metal-contact film-part. The metal-contact film-part is in contact with the metallic film and has crystalline properties for causing the atoms forming the metallic film to deposit in a manner conducive to formation of a low electrical resistivity level in the metallic film. The second of the two parts, the support-part, supports the first part. The support-part is chemically more durable than the metal-contact film-part, and is preferably an amorphous material, as compared to the metal-contact film-part. The described two-part base layer may be used within multilayer coatings of the type which include only a single metallic, reflective layer. Alternatively, the two part base layer may be used within multilayer coatings which include more than one metallic, reflective layer, in which case the two part base layer can be utilized beneath one or more of the metallic reflective layers.

The metal-contact film-part is chosen on the basis of an ability to cause the atoms of the metallic reflective layer to deposit in a form characterized by a low electrical resistivity level (hereinafter "resistivity"). The metallic reflective layer and the metal-contact film-part coordinate with one another, by which is meant that a low resistivity level of the metallic reflective layer is associated with a particular structural character of the metal-contact film-part. The crystal structure of the metallic reflective layer may, for instance, exhibit an orientation relationship with the metal-contact film-part. That, in turn, may result in larger grains, or alternatively speaking, smaller grain boundary area, or less of other electron scattering defects, within the film. In addition to its favorable effect on the electrical resistivity of the metallic reflective layer, the metal-contact film-part has a stabilizing influence on the structure of the metallic reflective layer during heat treatment that results in low haze formation in the multilayer coating after high temperature processing, as for example, tempering of a substrate coated with the multilayer coating of the present invention.

In general, the material chosen for the metal-contact film-part will depend on the identity of the metallic reflective layer, whether the metallic reflective layer is, for example, gold, copper, or silver.

In the case where the metallic reflective layer is silver, an example of a suitable material for the metal-contact part of the base layer is zinc oxide. In depositing the zinc oxide, care must be taken to select process parameters that provide the zinc oxide with a suitable crystallinity or preferential crystal growth orientation for favorably affecting deposition of the silver atoms. One way of doing this is to have a preponderance of oxygen over argon during the sputtering of a cast zinc metal target. Another example of a suitable material for the metal-contact film-part of the base layer is zinc aluminum oxide sputtered from a ceramic tile of appropriate composition. Still another example of a suitable material for the metal-contact part of the base layer is indium tin oxide. Other metal-contact film parts, i.e. other materials or same materials in other forms, that promote a preferentially (as opposed to randomly) oriented growth of the crystal grains within the metallic reflective layer may also be used.

The support part, which may be divided into subparts, has at least one part preferably in the form of a chemically and thermally resistant, preferably dielectric material. A suitable material is an amorphous sputtered oxide of zinc and tin, such as set forth in the above-referenced U.S. Pat. No. 4,610,771, the disclosure of which is incorporated herein by reference. It is also possible to deposit other dielectric films such as an amorphous oxide of tin or bismuth as the support part. For a high transmission and low emissivity application, such dielectric films would be preferably non-absorbing in the visible and infra-red portion of the spectrum. As between the three, the oxide of zinc and tin (also referred to herein as "zinc stannate") is preferred as the support part, because of its stronger bonding to the substrate and because of its greater chemical and thermal durability. The chemical durability of zinc stannate is superior to both zinc oxides and tin oxides. Therefore, because of zinc stannate's greater chemical durability, where the support film part of the base layer is zinc stannate and the metal-contact film-part of the two part base layer is zinc oxide, it is desirable to maximize the thickness of the zinc stannate support part for maximum chemical durability of the base layer, and minimize the thickness of the zinc oxide metal-contact film-part, provided it remains of sufficient thickness to retain its ability to cause the metallic reflective layer deposited on it to form its low electrical resistivity level, as explained above.

As noted above, the base layer of the present invention will generally be deposited in a multilayered coating film stack between a transparent substrate and the first metallic reflective layer of the coating. If the multilayered coating contains more than one metallic reflective layer, a plurality of the base layers may be used, as for example, one base layer deposited below each of the metallic reflective layers of the multilayered coating.

The Metallic Reflective Film

As noted above, examples of suitable materials for the metallic reflective layer(s) of the multilayered coating of the present invention include but are not limited to gold, copper, silver, platinum, aluminum and combinations or alloys thereof, with silver being preferred for most purposes. In general, a suitable metal is one which is a good conductor of electricity, i.e. one having low electrical resistance, since that characteristic correlates well with the formation of a low emissivity coating.

The Primer Layer

Another component of the multilayered coating of the present invention is a primer layer. The primer layer is an oxygen-capturing material, and may include an oxygen-capturing metal(s), e.g. including but not limited to titanium, zirconium, tantalum, niobium, nickel, chromium, copper, aluminum, hafnium and mixtures or alloys thereof. The primer layer is generally deposited over the substrate-far side of the metallic reflective layer, whereupon the primer layer acts as a sacrificial layer to protect the metallic reflective layer from, among other things, oxidation during later deposition of the antireflective metal oxide-containing MDE layer (discussed below) deposited over the substrate-far side of the primer layer and/or oxidation induced by any subsequent high temperature processing of the coated article in an oxidizing atmosphere which may also tend to cause the undesirable oxidation of the metallic reflective layer.

The optimal thickness of the primer layer, e.g. the titanium layer, varies depending upon whether the coated article of the present invention will be exposed to high temperature processing during or after its manufacture.

Where the coated article is not expected to be exposed to high temperature processing in an oxidizing atmosphere, the primer layer may be thin (e.g. 8 to 12 Angstroms). In the absence of high temperature processing, the thin primer layer will suffice to protect the metallic reflective layer from oxidizing during the deposition of the MDE layer thereover.

However, if the coated article is expected to be subjected to high temperature processing, e.g. tempering, a thicker (e.g. greater than 20 Angstroms) primer layer may be employed. This is so because heat treatment in an oxidizing environment generally accelerates oxidation and the thicker primer layer will be able to withstand the strongly oxidizing conditions of high temperature processing. See for example, U.S. Pat. No. 4,806,220, the disclosure of which is incorporated herein by reference. In the practice of the invention, it has been found that where the coated article will be exposed to heat treatment, there is a point at which the primer layer may be made either too thin or too thick. Too thin a primer layer, e.g. below about 20 Angstroms, results in a lack of protection for the reflective, metallic film from oxidation at high temperature thus rendering the coated article unacceptable for heat treatment and in poor shear resistance which makes the article unsuitable for long distance shipment or additional thermal processing. Too thick a primer layer, e.g. about 30 Angstroms, results in the formation of an undesirable haze in the coated article after heat treatment, also rendering it unacceptable for many applications. In the practice of the invention, it has been found that a preferred range of the thickness of the primer layer that will provide a coated article having adequate shear strength and acceptably low haze is in the range of from about 20 Angstroms to about 30 Angstroms, more preferably about 22 Angstroms to about 30 Angstroms, more preferably still about 24 Angstroms to about 28 Angstroms.

The Protective Overcoat

Typically, the multilayered coatings of the invention will be overcoated by a protective overcoat layer, such as a hard layer of titanium oxide. Such is taught by F. H. Gillery et al. in U.S. Pat. Nos. 4,716,086 and 4,786,563, the disclosures of which are each hereby incorporated herein by reference. Protective overcoat layers of other chemically resistant materials may be deposited as either metal or oxides.

Selected Combinations of Layers

In the following discussion, selected non-limiting combinations of the above described layers to provide multilayered coatings in accordance with the present invention are discussed to illustrate the present invention. It is to be understood that other combinations are possible and are contemplated as within the scope of the present invention.

In one embodiment of the present invention, there is provided a high transmittance, low emissivity mechanically durable e.g. scratch resistant coated article which includes:

a transparent, nonmetallic substrate;

a dielectric, antireflective base layer deposited over the substrate;

a metallic reflective layer deposited over the base layer;

a primer layer deposited over the metallic reflective layer; and an MDE layer deposited over the primer layer, wherein the MDE layer includes at least two sublayers, wherein a first sublayer deposited over the primer layer includes an oxide of zinc and a second sublayer deposited over the first sublayer includes an oxide of zinc and tin.

In an alternative embodiment of the present invention, the multilayer coating further includes a protective overcoat layer deposited over the MDE layer.

In a preferred embodiment the base layer includes a crystalline metal-contacting film-part and a support part where the support part is in contact with the substrate and where the support part is comprised of a material other than the crystalline metal-contacting film-part to provide a coated article suitable for high temperature processing with little or no haze formation and is resistant to surface scratching prior to and after high temperature processing.

In a still more preferred embodiment of the present invention, the transparent, nonmetallic substrate is glass, the support part is a zinc stannate film, the crystalline metal-contacting film-part is a zinc oxide film; the metallic reflective layer is a silver film, the primer layer is deposited as titanium metal, the dielectric, antireflective MDE layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin, and the protective overcoat layer is a titanium oxide film.

In an alternative embodiment of the present invention there is provided a high transmittance, low emissivity mechanically durable e.g. scratch resistant coated article suitable which includes:

a transparent, nonmetallic substrate;

a first dielectric, antireflective base layer deposited over the substrate, a first metallic reflective layer deposited over the base layer;

a first primer layer deposited over the metallic reflective layer;

a second dielectric, antireflective base layer deposited over the first primer layer;

a second metallic reflective layer deposited over the second base layer;

a second primer layer deposited over the second metallic reflective film; and a dielectric, antireflective MDE layer deposited over the second primer layer, wherein the MDE layer includes at least two sublayers, wherein a first sublayer deposited over the second primer layer includes an oxide of zinc and a second sublayer deposited over the first sublayer includes an oxide of zinc and tin.

In a preferred embodiment of the above described embodiment of the present invention, a protective overcoat layer is deposited over the MDE layer.

In a still more preferred embodiment of the above described embodiment of the present invention, the first base layer includes a crystalline metal-contacting film-part and a support part where the support part is in contact with the substrate and where the support part is comprised of a material other than the crystalline metal-contacting film-part. In yet a still more preferred embodiment of the present invention, the second base layer also includes a crystalline metal-contacting film-part and a support part where the support part is in contact with the primer layer and where the support part is comprised of a material other than the crystalline metal-contacting film-part of the second base layer. The above-described embodiments including the two-part base film(s) provide coated articles which is/are suitable for high temperature processing with little or no haze formation and which is/are resistant to surface scratching prior to and after high temperature processing.

In a preferred embodiment of the above described alternative embodiment of the present invention, the transparent, nonmetallic substrate is glass, the support part of the first base layer is a zinc stannate film, the crystalline metal-contacting film-part of the first base layer is a zinc oxide film; the first metallic reflective layer is a silver film, the first primer layer is deposited as titanium metal, the support part of the second base layer is a zinc stannate film, the crystalline metal-contacting film-part of the second base layer is a zinc oxide film; the second metallic reflective layer is a silver film, the second primer layer is deposited as titanium metal, the dielectric, antireflective MDE layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin, and the protective overcoat layer is a titanium oxide film.

In still another embodiment of the present invention, where the high transmittance, low emissivity coated article is a double stack including two reflective metallic films, and where it is not intended to be subjected to high temperature processing, an article with improved shelf life and enhanced mechanical durability may be obtained as follows.

In one embodiment, the coated article includes:

a transparent, nonmetallic substrate;

a first dielectric, antireflective base layer deposited over the substrate;

a first metallic reflective layer deposited over the first base layer;

a first primer layer deposited over the metallic reflective film;

a second dielectric, antireflective base layer deposited over the first primer layer, the second base layer including a crystalline metal-contacting film-part which is a zinc oxide film, and a support part, wherein the support part is further comprised of a first layer of a zinc oxide film in contact with the first primer layer and a second layer of a zinc stannate film in contact with the crystalline metal-contacting film part;

a second metallic reflective layer deposited over the crystalline metal-contacting film-part of the second base layer;

a second primer layer deposited over the second metallic reflective film; and a dielectric, antireflective MDE layer deposited over the second primer layer, wherein the MDE layer includes at least two sublayers, wherein a first sublayer deposited over the second primer layer includes an oxide of zinc and a second sublayer deposited over the first sublayer includes an oxide of zinc and tin.

In an alternative embodiment of the above described embodiment of the present invention, a protective overcoat layer is deposited over the MDE layer.

In a preferred embodiment, the first base layer includes a crystalline metal-contacting film-part and a support part where the support part is in contact with the substrate and where the support part is comprised of a material other than the crystalline metal-contacting film-part.

In yet another preferred embodiment of the above described alternative embodiment of the present invention, the transparent, nonmetallic substrate is glass, the support part of the first base layer is a zinc stannate film, the crystalline metal-contacting film-part of the first base layer is a zinc oxide film; the first metallic reflective layer is a silver film, the first primer layer is deposited as titanium metal, the second metallic reflective layer is a silver film, the second primer layer is deposited as titanium metal, the MDE layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin, and the protective overcoat layer is a titanium oxide film.

Further illustrative of the invention are the following examples. In the examples, all coatings described were made in double-ended in-line production coaters in which the substrate, e.g. a glass piece, is moved from the entry end to the exit end of the coater at a constant speed. During its travel, the substrate passes under a number of energized sputter cathodes. These cathodes deposit contiguous thin films of various materials on the substrate surface.

The type of the film material formed on the surface of the substrate depends on the sputter cathode target material and the composition of the working gas in the deposition chamber. Thus, for example, silver or titanium targets sputtered in an inert gas atmosphere such as argon, provide thin films of metallic silver or titanium, respectively. On the other hand, transparent films of zinc stannate, zinc oxide, or titanium oxide may be formed when the cathode target consists of an appropriate alloy of zinc-tin, pure zinc, or titanium, respectively, and the working gas in the deposition chamber is a mixture of oxygen and argon with a sufficient concentration of oxygen.

The following examples demonstrate the increased the mechanical durability of the novel coatings of the present invention.

EXAMPLE 1

In this Example, the improved mechanical durability of coatings which included the MDE layer of the present invention were compared with a similar coating which did not include the MDE film. More particularly, a group of six samples was prepared, each of which included a glass substrate overcoated with a multilayer coating. The layers of the multilayer coatings were deposited by the MSVD process. Four of the samples included an MDE layer in accordance with the present invention which were compared to two samples in which, respectively, the MDE layer was replaced by either a zinc stannate monolayer or a zinc oxide monolayer. The six samples were subjected to an operation designed to produce scratches on the surface of each multilayer coating. The six samples were then heated to a temperature which simulated tempering. The samples were cooled and then evaluated and ranked in terms of ability to resist surface scratching.

More particularly, a first 24 inch by 36 inch by 3.3 millimeter piece of clear float glass was coated in the above described coater with a base layer, a metallic reflective layer, a primer layer, a zinc stannate monolayer and a protective overcoat layer (Sample 1). A second 24 inch by 36 inch by 3.3 millimeter piece of clear float glass was coated in the same manner with a base layer, a metallic reflective layer, a primer layer, a zinc oxide monolayer and a protective overcoat layer (Sample 6). Each of the remaining 4 pieces of 24 inch by 36 inch by 3.3 millimeter clear float glass were coated in the above described coater with a base layer, a metallic reflective layer, a primer layer, an MDE layer which differed from the other MDE layers and a protective overcoat layer to provide Samples 2–5. The layer stacks of Samples 1–6 are set forth in Table 2 below, along with selected coating conditions or thickness parameters for selected samples as follows:

TABLE 2

| Sample | Substrate | Base Layer | Metallic Reflective Layer | Primer Layer | Zinc Stannate Monolayer or Zinc Oxide Monolayer or MDE Layer | Protective Overcoat Layer |
|---|---|---|---|---|---|---|
| 1 | Glass | Zinc stannate support part Zinc oxide metal contacting film part | Silver | Titanium | Zinc stannate monolayer 260Å est. thickness | Titanium oxide layer |
| | | *SA = 85–88% $O_2$/balance argon | SA = argon | SA = argon | SA = 85–88% $O_2$/balance argon | SA = 80% $O_2$/20 |
| 2 | Glass | Zinc stannate support part Zinc oxide metal contacting film part | Silve | Titanium | Zinc oxide/zinc stannate MDE bilayer having 278Å est. total thickness, each sublayer comprising: Zinc oxide: 95Å est. thickness Zinc stannate: 183Å est. thickness | Titanium oxide layer |
| | | SA = 85–88% $O_2$/balance argon | SA = argon | SA = argon | | SA = 80% $O_2$/20 |
| 3 | Glass | Zinc stannate support part Zinc oxide metal contacting film part | Silver | Titanium | Zinc oxide/zinc stannate/zinc oxide MDE trilayer | Titanium oxide layer |
| | | SA = 85–88% $O_2$/balance argon | SA = argon | SA = argon | | SA = 80% $O_2$/20 |
| 4 | Glass | Zinc stannate support part Zinc oxide metal contacting film part | Silver | Titanium | Zinc oxide/zinc stannate/zinc oxide/zinc stannate four sublayer MDE layer having 288Å est. total thickness, each sublayer comprising: Zinc oxide: 105Å est. thickness Zinc stannate: 105Å est. | Titanium oxide layer |

TABLE 2-continued

| Sample | Substrate | Base Layer | Metallic Reflective Layer | Primer Layer | Zinc Stannate Monolayer or Zinc Oxide Monolayer or MDE Layer | Protective Overcoat Layer |
|---|---|---|---|---|---|---|
| | | | | | thickness<br>Zinc oxide:<br>thickness<br>Zinc stannate: 30Å est.<br>thickness | 48Å est. |
| | | SA = 85–88% $O_2$/balance argon | SA = argon | SA = argon | SA = 85–88% $O_2$/balance argon | SA = 80% $O_2$/20 |
| 5 | Glass | Zinc stannate support<br>Zinc oxide metai contacting film part | Silver | Titanium part | Zinc stannate/zinc oxide MDE bilayer | Titanium oxide layer |
| | | SA = 85–88% $O_2$/balance argon | SA = argon | SA = argon | | SA = 80% $O_2$/20 |
| 6 | Glass | Zinc stannate support part<br>Zinc oxide metal contacting film part | Silver | Titanium | Zinc oxide monolayer | Titanium oxide layer |
| | | SA = 85–88% $O_2$/balance argon | SA = argon | SA = argon | | SA = 80% $O_2$/20 |

*SA = sputtering atmosphere

The layers shown in Table 2 were all deposited on an Airco 84 inch production coater, available from BOC Coating Technologies of Fairfield, Calif. The thickness of the zinc stannate film of Sample 1 deposited over the primer layer was estimated based on known thickness measurements of the zinc stannate layers deposited under similar deposition conditions directly over glass substrate surfaces. The thickness of the zinc oxide and zinc stannate sublayers in the MDE layers were similarly estimated from known thickness measurements of zinc oxide films and zinc stannate films deposited under similar deposition conditions directly deposited over glass substrate surfaces.

Prior to tempering, a portion of the coated surface of each of the six samples was then abraded. The abrading was performed by hand wiping with substantial force normal to the surface of the coating with either a cotton cloth wetted in deionized water (with 20 successive back and forth strokes over the same area) or with an abrasive Scotch Bright® type pad available from the 3M Corporation (with 3 successive back and forth strokes over the same area). After abrading, the samples were heated to approximately 1180° F. (637° C.) for about 6 minutes to simulate tempering.

The samples were then cooled and visually inspected for surface scratches by placing each sample over a black felt pad and viewing with the unaided eye. The samples were then ranked relative to each other in terms of resistance to surface scratching.

Sample 1 was used as a basis for comparison of the scratch resistance of the novel MDE films of the present invention. Against Sample 1, the testing procedure demonstrated that the MDE layer of Sample 4 was significantly superior, and was in fact superior to all of the remaining 5 samples. The MDE layer of Sample 2 was found to provide the second most scratch resistant multilayered coating. While improved over Sample 1, Samples 3 and 5 did not show a degree of scratch resistance comparable to Samples 2 and 4. Sample 6 showed a modest increase in resistance to surface scratching, but again, not comparable to that of Samples 2 and 4.

EXAMPLE 2

The effect of deposition atmosphere on the scratch resistance of coatings including the MDE layer of the present invention was investigated in this Example. It was found that where the base layer, MDE layer and protective overcoat layer were all deposited in a pure oxygen atmosphere as opposed to an mixed oxygen/argon gas atmosphere, a coating having an increased resistance to surface scratching is obtained.

More particularly, four samples, Samples 7–10 were prepared as set forth in Table 3 below. The samples each included a 24 inch by 36 inch by 3.3 mm thick glass substrate having deposited thereover in the following order a two-part base layer, a silver metallic reflective layer, a titanium primer layer, either a zinc stannate monolayer or an MDE layer of the present invention, and a titanium oxide protective overcoat layer.

More particularly, Sample 7 included a zinc stannate monolayer deposited over the primer layer, with the oxide layers of Sample 7 (e.g. base layer, primer layer, zinc stannate layer and protective overcoat) being sputtered in a mixed oxygen/argon atmosphere similar to that of Sample 1. Sample 8 similarly included a zinc stannate monolayer deposited over the primer layer, however the oxide layers of Sample 8 were sputtered in a nominally pure oxygen atmosphere. Sample 9 included the four-part MDE layer of the present invention deposited over the primer layer, with the oxide layers of Sample 9 sputtered in a nominally pure oxygen atmosphere. Sample 10 similarly included the four-part MDE layer of the present invention deposited over the primer layer, however the oxide layers of Sample 10 were sputtered in a mixed oxygen/argon atmosphere similar to that of Sample 1.

Table 3 below provides layer stacks, sputtering atmospheres and selected layer thicknesses.

TABLE 3

| Sample | Substrate | Base Layer | Metallic Reflective Layer | Primer Layer | Zinc Stannate Monolayer or Zinc Oxide Monolayer or MDE Layer | Protective Overcoat Layer |
|---|---|---|---|---|---|---|
| 7 | Glass | Zinc stannate support part Zinc oxide metal contacting film part | Silver | Titanium | Zinc stannate monolayer 256Å est. thickness | Titanium oxide |
| | | *SA = 85–88% $O_2$/balance argon | SA = argon | SA = argon | SA = 85–88% $O_2$/balance argon | SA = 80% $O_2$/20% argon |
| 8 | Glass | Zinc stannate support part Zinc oxide metal contacting film part | Silver | Titanium | Zinc stannate monolayer 187 Å est. thickness | Titanium oxide |
| | | SA = nominally pure $O_2$ | SA = argon | SA = argon | SA = nominally pure $O_2$ | SA = nominally pure $O_2$ |
| 9 | Glass | Zinc stannate support part Zinc oxide metal contacting film part | Silver | Titanium | Zinc oxide/zinc stannate/zinc oxide/zinc stannate four sublayer MDE layer having 313 Å est. total thickness, each sublayer having Zinc oxide: 105 Å est. thickness Zinc stannate: 67 Å est. thickness Zinc oxide: 96 Å est. thickness Zinc stannate: 45 Å est. thickness | Titanium oxide |
| | | SA = nominally pure $O_2$ | SA = argon | SA = argon | SA = nominally pure $O_2$ | SA = nominally pure $O_2$ |
| 10 | Glass | Zinc stannate support part Zinc oxide metal contacting film part | Silver | Titanium | Zinc oxide/zinc stannate/zinc oxide/zinc stannate four sublayer MDE layer having 288 Å est. total thickness, each sublayer having Zinc oxide: 100 Å est. thickness Zinc stannate: 70 Å est. thickness Zinc oxide: 91 Å est. thickness Zinc stannate: 27 Å est. thickness | Titanium oxide |
| | | SA = 85–88% $O_2$/balance argon | SA = argon | SA = argon | SA = nominaliy pure $O_2$ | SA = 80% $O_2$/20% argon |

*SA = sputtering atmosphere

Samples 7–10 were all deposited in an Airco 84" production coater. To offset the reduced deposition rate of the nominally pure oxygen deposition atmospheres of Samples 8 and 9, wherein the rate of deposition is reduced relative to the argon-containing atmospheres of Samples 7 and 10, the target currents of the cathodes used for sputtering the oxide layers was increased in Samples 8 and 9. The metal layers of Samples 7–10 were deposited in a pure argon atmosphere.

After coating, Samples 7–10 were then placed in a glass coater entry washer to test the mechanical durability of each respective coating. The washer used in this example included two types of brushes: a cylinder brush and a plurality of cup brushes. The cup brushes rotate rapidly about the brush axis while reciprocating laterally in a direction normal to the direction of travel of the substrate through the coater, and contact the top surface of the glass light. The cup brush bristles are typically used to remove dirt and contamination from the surface of an uncoated substrate (e.g. a glass substrate) and are, therefore, harder and more abrasive than the softer brushes typically for cleaning the surface of coated glass substrates.

After passing through the washer, Samples 7–10 were visually examined with the aid of 150 flood-type light available under the tradename Capsylite from Sylvania Corporation. The flood-type light was traversed back and forth, top to bottom of each sample to produce light reflected from the coated side of the sample which was visually examined for mechanical damage, e.g. surface scratches caused by the brushes.

All of the Samples 7–10 showed different levels of brush marks, in turn revealing the coating's mechanical durability. The samples were ranked for coating damage due to brush contact. Sample 9 was found to have the most mechanically durability, following in turn by Samples 10, 8, and 7.

Thus, again the four-sublayer MDE layer of the present invention of Sample 9 was found to be the superior coating based upon the comparison of Sample 9 with Samples 7, 8 and 10. In addition, the experiment suggested that such coatings deposited in a pure oxygen as the working gas in the deposition of the oxide layers, are harder than those made in a mixed gas atmosphere from the comparison of Sample 9 with Sample 10.

It is noted that the thickness of the zinc oxide and zinc stannate sublayers of the MDE layer of Sample 9 were significantly different from those of Sample 4. It is noted that this difference does not appear to affect the improved hardness of the four layer system, as both Samples 9 and 4 showed improved mechanical durability over the remaining samples with which they were compared.

The above examples are offered to illustrate the present invention. Various modifications are included.

For example, other coating compositions are within the scope of the present invention. Depending on the proportions of zinc and tin when a zinc/tin alloy is sputtered, films of oxide of zinc and tin may deviate significantly from exact stoichiometry of zinc stannate (i.e., deviations from a 2:1 Zn:Sn atom ratio). While deposited as titanium metal, after deposition the primer layers may comprise titanium metal in various states of oxidation. Other metals such as zirconium and chromium are also useful as primers in accordance with the present invention.

Process parameters such as pressure and concentration of gases may be varied over a broad range, as long as the intended structures of each layer, as described in the body of this text, are realized.

By high temperature processing in the foregoing, it is meant operations such as tempering, bending and annealing, which may be carried out in a lehr that can rapidly elevate the glass temperature to temperatures within the ranges of about (1160° F. (627° C.) to 1250° F. (677° C.), preferably 1170° F. (632° C.) to 1200° F. (649° C.)).

The present invention may be used to provide high transmittance, low emissivity glazing for architectural use and for use in land, sea, air and/or space vehicles, as for example, an automotive transparency, more particularly an automotive windshield, among other applications.

Thus, it is to be understood that the above are preferred modes of carrying-out the invention and that various changes and alterations can be made without departing from the spirit and broader aspects of the invention as defined by the claims set forth below and by the range of equivalency allowed by law.

What is claimed is:

1. A high transmittance, low emissivity mechanically durable coated article comprising:

a transparent, nonmetallic substrate;

a dielectric, antireflective base layer deposited over the substrate;

a metallic reflective layer deposited over the base layer;

a primer layer deposited over the metallic reflective layer; and a mechanical durability enhancing layer deposited over the primer layer, wherein the mechanical durability enhancing layer comprises at least two sublayers, wherein a first sublayer deposited over the primer layer includes an oxide of zinc and a second sublayer deposited over the first sublayer includes an oxide of zinc and tin.

2. The coated article of claim 1 further comprising a protective overcoat layer deposited over the mechanical durability enhancing layer.

3. The coated article of claim 2 wherein said base layer is in contact with said substrate, said metallic reflective layer is in contact with said base layer, said primer layer is in contact with said metallic reflective layer, said mechanical durability enhancing layer is in contact with said primer layer and said protective overcoat layer is in contact with said mechanical durability enhancing layer.

4. The coated article of claim 1 wherein the mechanical durability enhancing layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin.

5. The coated article of claim 2 wherein the base layer further comprises:

a crystalline metal-contacting film-part; and a support part;

where the support part is in contact with the substrate and where the support part is comprised of a material other than the crystalline metal-contacting film-part.

6. The coated article of claim 5 wherein the transparent, nonmetallic substrate is glass, the support part is a zinc film, the crystalline metal-contacting film-part is a zinc oxide film; the metallic reflective layer is a silver film, the primer layer is titanium metal, the mechanical durability enhancing layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin and the protective overcoat layer is a titanium oxide film.

7. A high transmittance, low emissivity mechanically durable coated article comprising:

a transparent, nonmetallic substrate;

a first dielectric, antireflective base layer deposited over the substrate, a first metallic reflective layer deposited over the base layer;

a first primer layer deposited over the metallic reflective layer;

a second dielectric, antireflective base layer deposited over the first primer layer;

a second metallic reflective layer deposited over the second base layer;

a second primer layer deposited over the second metallic reflective film; and a dielectric, antireflective mechanical durability enhancing layer deposited over the second primer layer, wherein the mechanical durability enhancing layer includes at least two sublayers, wherein a first sublayer deposited over the second primer layer includes an oxide of zinc and a second sublayer deposited over the first sublayer includes an oxide of zinc and tin.

8. The coated article of claim 7 further comprising a protective overcoat layer deposited over the mechanical durability enhancing layer.

9. The coated article of claim 8 wherein said first base layer is in contact with said substrate, said first metallic reflective layer is in contact with said first base layer, said first primer layer is in contact with said first metallic reflective layer, said second base layer is in contact with said first primer layer, said second metallic reflective layer is in contact with said second base layer, said second primer layer is in contact with said second metallic reflective layer, said mechanical durability enhancing layer is in contact with said second primer layer and said protective overcoat layer is in contact with said mechanical durability enhancing layer.

10. The coated article of claim 7 wherein the mechanical durability enhancing layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin.

11. The coated article of claim 8 wherein the first base layer comprises a crystalline metal-contacting film-part and a support part where the support part is in contact with the substrate and where the support part is comprised of a material other than the crystalline metal-contacting film-part.

12. The coated article of claim 11 wherein the second base layer comprises a crystalline metal-contacting film-part and a support part where the support part is in contact with the primer layer and where the support part is comprised of a material other than the crystalline metal-contacting film-part of the second base layer.

13. The coated article of claim 12 wherein the transparent, nonmetallic substrate is glass, the support part of the first base layer is a zinc stannate film, the crystalline metal-contacting film-part of the first base layer is a zinc oxide film; the first metallic reflective layer is a silver film, the first primer layer is deposited as titanium metal, the support part of the second base layer is a zinc stannate film, the crystalline metal-contacting film-part of the second base layer is a zinc oxide film; the second metallic reflective layer is a silver film, the second primer layer is deposited as titanium metal, the mechanical durability enhancing layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin, and the protective overcoat layer is a titanium oxide film.

14. A high transmittance, low emissivity coated article with improved shelf life and enhanced mechanical durability comprising:

a transparent, nonmetallic substrate;

a first dielectric, antireflective base layer deposited over the substrate;

a first metallic reflective layer deposited over the first base layer;

a first primer layer deposited over the metallic reflective film;

a second dielectric, antireflective base layer deposited over the first primer layer, the second base layer including a crystalline metal-contacting film-part which is a zinc oxide film, and a support part, wherein the support part is further comprised of a first layer of a zinc oxide film in contact with the first primer layer and a second layer of a zinc stannate film in contact with the crystalline metal-contacting film part;

a second metallic reflective layer deposited over the crystalline metal-contacting film-part of the second base layer;

a second primer layer deposited over the second metallic reflective film; and a dielectric, antireflective mechanical durability enhancing layer deposited over the second primer layer, wherein the mechanical durability enhancing layer includes at least two sublayers, wherein a first sublayer deposited over the second primer layer includes an oxide of zinc and a second sublayer deposited over the first sublayer includes an oxide of zinc and tin.

15. The coated article of claim 14 further comprising a protective overcoat layer deposited over the mechanical durability enhancing layer.

16. The coated article of claim 15 wherein said first base layer is in contact with said substrate, said first metallic reflective layer is in contact with said first base layer, said first primer layer is in contact with said first metallic reflective layer, said second base layer is in contact with said first primer layer, said second metallic reflective layer is in contact with said second base layer, said second primer layer is in contact with said second metallic reflective layer, said mechanical durability enhancing layer is in contact with said second primer layer and said protective overcoat layer is in contact with said mechanical durability enhancing layer.

17. The coated article of claim 14 wherein the mechanical durability enhancing layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin.

18. The coated article of claim 15 wherein the first base layer further comprises a crystalline metal-contacting film-part and a support part where the support part is in contact with the substrate and where the support part is comprised of a material other than the crystalline metal-contacting film-part.

19. The coated article of claim 18 wherein the transparent, nonmetallic substrate is glass, the support part of the first base layer is a zinc stannate film, the crystalline metal-contacting film-part of the first base layer is a zinc oxide film; the first metallic reflective layer is a silver film, the first primer layer is deposited as titanium metal, the second metallic reflective layer is a silver film, the second primer layer is deposited as titanium metal, the mechanical durability enhancing layer includes four sublayers including a first sublayer which includes zinc oxide, having deposited thereover a second sublayer including an oxide of zinc and tin, having deposited thereover a third sublayer including zinc oxide, having deposited thereover a fourth sublayer including an oxide of zinc and tin, and the protective overcoat layer is a titanium oxide film.

* * * * *